US010054418B2

(12) United States Patent
Bernard

(10) Patent No.: US 10,054,418 B2
(45) Date of Patent: Aug. 21, 2018

(54) APPARATUS FOR DETERMINING THE THICKNESS OF A MAIL ITEM

(71) Applicant: NEOPOST TECHNOLOGIES, Bagneux (FR)

(72) Inventor: Dominique Bernard, Massy (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 537 days.

(21) Appl. No.: 14/553,155

(22) Filed: Nov. 25, 2014

(65) Prior Publication Data

US 2015/0153150 A1    Jun. 4, 2015

(30) Foreign Application Priority Data

Nov. 29, 2013    (EP) ..................... 13306638

(51) Int. Cl.
*G01B 7/06* (2006.01)
*G07B 17/00* (2006.01)
*B65H 7/02* (2006.01)
*B65H 7/12* (2006.01)

(52) U.S. Cl.
CPC ................. *G01B 7/06* (2013.01); *B65H 7/02* (2013.01); *B65H 7/12* (2013.01); *G07B 17/00661* (2013.01); B65H 2402/5441 (2013.01); B65H 2511/13 (2013.01); B65H 2511/214 (2013.01); B65H 2515/708 (2013.01); B65H 2553/612 (2013.01); B65H 2701/1916 (2013.01); G07B 2017/00685 (2013.01)

(58) Field of Classification Search
CPC .... G07B 17/00661; G07B 17/06; B65H 7/12; B65H 7/02; G01B 7/06
See application file for complete search history.

(56) References Cited

U.S. PATENT DOCUMENTS

| | | | |
|---|---|---|---|
| 5,458,324 A * | 10/1995 | Nakamura | B65H 27/00 271/10.02 |
| 6,237,427 B1 * | 5/2001 | Helfrich | G01F 1/28 198/502.2 |
| 7,151,608 B2 | 12/2006 | Dian et al. | |
| 7,182,339 B2 | 2/2007 | Engarto et al. | |
| 2007/0198440 A1 * | 8/2007 | Defosse | G01B 11/0691 705/407 |
| 2009/0150117 A1 | 6/2009 | Krasuski | |

FOREIGN PATENT DOCUMENTS

| | | |
|---|---|---|
| EP | 1 764 747 A2 | 3/2007 |
| GB | 2 236 859 A | 4/1991 |

OTHER PUBLICATIONS

European Search Report for EP 13 30 6638 dated Jan. 21, 2014.

* cited by examiner

*Primary Examiner* — Alesa Allgood
*Assistant Examiner* — Brent J Andrews
(74) *Attorney, Agent, or Firm* — Seed IP Law Group LLP

(57) ABSTRACT

An apparatus for determining the thickness of passing mail items M conveyed on a conveying deck (12) of a mail processing machine (10) comprising a deflecting element (18) which is positioned to successively contact without active compression each conveyed mail item, measures a parameter that indicates a change in a resistivity of the deflecting element, and generates a signal indicative of the measured parameter; and a processing unit (24) which receives the signal from the deflecting element and determines a thickness value for each conveyed mail item based on the measured parameter.

20 Claims, 3 Drawing Sheets

APPARATUS FOR DETERMINING THE THICKNESS OF A MAIL ITEM

TECHNICAL FIELD

The present invention relates generally to device and methods for processing mail and more particularly, to an apparatus for determining the thickness of a mail item singulated from a stack as each mail item is processed individually, e.g. in an automatic feeding module of a postage machine.

BACKGROUND

Since long various techniques are well known for measuring the thickness of a flat mail item on the fly in a postal processing machine such as a postage meter, a sorter or a folder-inserter. However, thickness measurement remains generally hard to perform with a simple and economical solution as filled mail items do not generally present a uniform thickness on the one hand, and jolts and rebounds to which these mail items are subject, distort this determination on the other hand. One can cite the conventional electromechanical technique, the laser reflection technique and the imaging technique which are illustrated e.g. in the following prior art references.

U.S. Pat. No. 7,182,339 discloses a new and improved thickness measuring device in which a rotary encoder is mounted upon a mounting bracket, and a movable lever arm is fixedly connected to the rotary shaft of the rotary encoder. A first end of the lever arm has an idler wheel or roller mounted thereon which is adapted to be disposed either in contact with an outer one of a pair of conveyor belts which are provided for conveying mail pieces or units along a conveyor path defined between the pair of conveyor belts, or alternatively, in contact with a single conveyor belt along which the mail pieces or units are conveyed. A hydraulic damper is disposed in contact with the first end of the lever arm, while a second opposite end of the lever arm is fixedly connected to a biasing return spring.

U.S. Pat. No. 7,151,608 relates to a method of using reflection of a laser ray for measuring the thickness of a flat mail item moving through a sorting machine. This method consists in nipping the mail item by means of an elastically deformable member that is movably mounted and that moves with the movement of the mail item, said member having a first surface in contact with one face of said mail item, and a reflective second surface substantially parallel to said first surface; and directing the laser ray onto said reflective second surface for the purpose of measuring the thickness of the mail item.

EP 1 764 747 describes an improved apparatus and method for determining the thickness of a mail piece for dimension-based postal-rating schemes. This includes capturing a first image of at least a portion of a surface of a mail piece, determining a first optical image for a feature from the first image, capturing a second image of the portion of the surface of the mail piece after the mail piece has been transported some distance, and determining a second optical image for the feature from the second image, the second optical image forming an angle with respect to the first optical image. The first image and the second image are then correlated to determine a displacement of the feature, and thickness of the mail piece can then determined based on the displacement of the feature and the angle between the first and second optical axes.

Though equipments and methods mentioned above have provided satisfactory services or results in the past, they did not always provide a simple and inexpensive way to monitor measurement quality in real-time.

OBJECT AND DEFINITION OF THE INVENTION

It is therefore an object of the invention to provide an improved method or device for determining the thickness of a passing mail item which overcomes the drawbacks set forth above in a high speed automated mail handling system that processes individual mail items without damaging them.

Another object of the invention is to propose a measurement method or device that really proves simple to implement, cheap enough and in particular presents a small footprint and does not impact the architecture of the mail processing machine.

According to a first aspect of the invention, these objects are achieved through the provision of an apparatus for determining the thickness of passing mail items M conveyed on a conveying deck of a mail processing machine, characterized in that it comprises:

a deflecting element which is positioned to successively contact without active compression each conveyed mail item, measures a parameter that indicates a change in a resistivity of the deflecting element, and generates a signal indicative of the measured parameter; and a processing unit which receives the signal from said deflecting element and determines a thickness value for each conveyed mail item based on said measured parameter.

Said measured parameter is an ohmic resistance r of a sensor of said deflecting element caused by contact with the mail item.

Each feature mentioned above proves simple enough for efficiently contributing in determining on the fly and accurately enough the thickness of the mail items while they are moving, specially without distorting measurement with an active compression of the mail item.

According to a desired embodiment, said deflecting element is formed of at least a thin sensor secured at a proximal end to a sensor mount attached itself to a registration wall of the mail processing machine or of a series of thin sensors secured at their proximal ends to respective sensor mounts, each of which having a particular technical design with a specific deflection or thickness detection range and active level corresponding e.g. to a typical postage rate.

Preferably, said processing unit is adapted to determine a thickness profile of the mail item over the entire length of mail item based on said ohmic resistance caused by unbroken contact with the mail item on the one hand, and a length L of the mail item based on a transport displacement and a time period on the other hand and is also adapted to determine a double detection of mail items based on a sudden change within the thickness profile of mail item combined with an abnormal measured length of mail item according to standard mail lengths.

According to a desired embodiment, said mail items are conveyed flat on said conveying deck and said deflecting element is located vertically or conveyed on edge on said conveying deck and said deflecting element is located horizontally.

Advantageously, said deflecting element returns after a bending move to a rest position in abutment against a rest slit arranged in said conveying deck. Said rest position is defined by a predetermined pre-stressing value corresponding to a reference thickness.

Preferably, a bearing element is located upstream and close to said deflecting element for optimally pressing the mail item against said conveying deck, and secured at a proximal end to a registration wall of the mail processing machine. Said bearing element comprises a holding arm at the lower end of which is fixed a supple flap, a supple brush, a supple pressure roller, or a supple pad formed by one or more juxtaposed elementary pads.

Advantageously, said at least one thin sensor exerts a light pressure on the mail item, and said bearing element applies an adjustable higher pressure on this mail item.

Other aspects of the invention are discussed further in the detailed description that follows.

BRIEF DESCRIPTION OF DRAWINGS

The invention can be understood more clearly in reading the following detailed description accompanied by illustrative and non-limiting examples with reference to the drawings, in which.

DETAILED DESCRIPTION OF PREFERRED EMBODIMENT

The present invention provides an improved thickness determination system that uses a deflecting element positioned in the running path of a mail processing machine such as a franking, folding-inserting or sorting machine.

Figure 1:
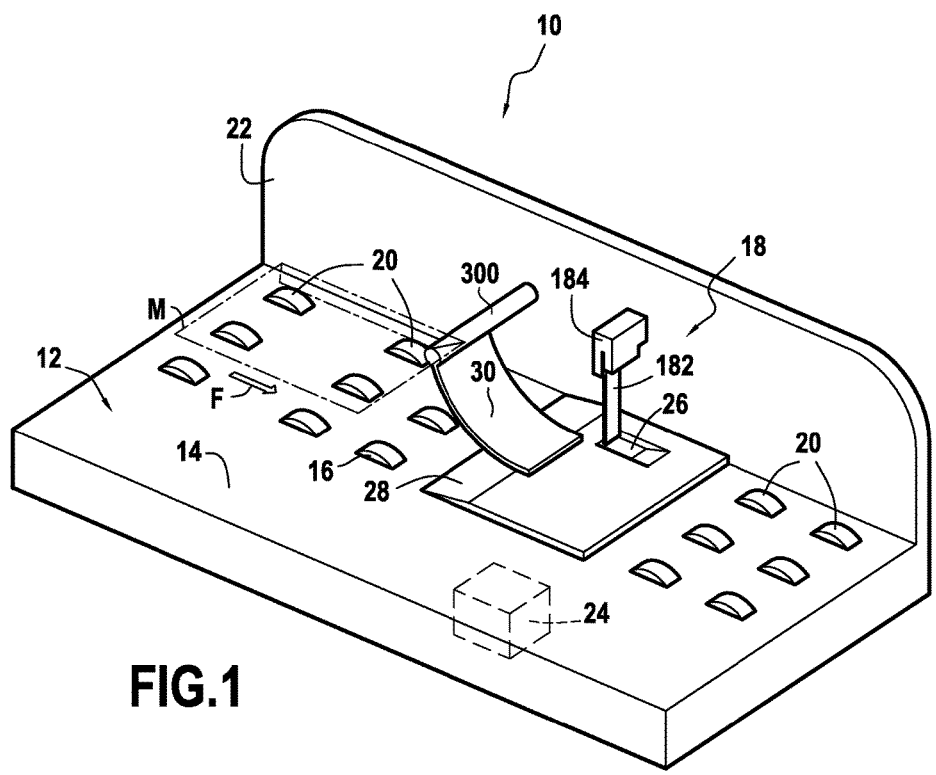
FIG. 1 is a schematic elevation view of a mail processing machine in which the thickness measuring device according to the invention can be used.

Referring to FIG. 1, the reference numeral 10 indicates a typical franking machine that includes a base unit 12 with its conveying deck 14, a singulating/feeding unit (illustrated by its bottom rollers 16 only), a thickness measuring device 18 and a franking unit not shown with its control sub-unit including a keyboard and a display device. Projecting upwardly through openings in the conveying deck, a series 20 of transport rollers is mounted for conveying mail items M downstream while nudging them against a vertical registration wall 22. As usual, a conventional transport mechanism located under the conveying deck 14 conveys the mail items through these different units. It can include e.g. drive belts, idler or driving rollers.

According to the invention, the thickness measuring device 18 through which a mail item M is transported along the conveying deck 14 in the direction represented by arrow F comprises a deflecting element 180 linked to a processing unit 24 incorporated within the base unit 12. the deflecting element is positioned to successively contact each conveyed mail item, measures a parameter that indicates a change in a resistivity of the deflecting element, and generates a signal indicative of the measured parameter and the processing unit receives the signal from the deflecting element and determines a thickness value for each conveyed mail item based on the measured parameter.

More particularly, the deflecting element 180 comprises a thin (elongated) sensor 182 that changes in resistivity as it is flexibly bent, and is secured at its proximal end to a sensor mount, base or bracket 184 attached itself to the registration wall 22. Deflecting element 180 constantly returns after a bending move to a rest position in abutment against a rest slit 26 preferably arranged in a removable block 28 of the conveying deck 12 of the franking machine.

A bearing element 30 is located upstream and close to deflecting element 180 for optimally pressing the mail item against conveying deck 12, and secured at a proximal end to the registration wall 22. In an alternative implemented version, said bearing element comprises an holding arm 300 at the lower end of which is mounted a supple flap 302, a supple brush, a supple pressure roller, or a supple pad formed by one or more juxtaposed elementary pads.

Figure 2A:
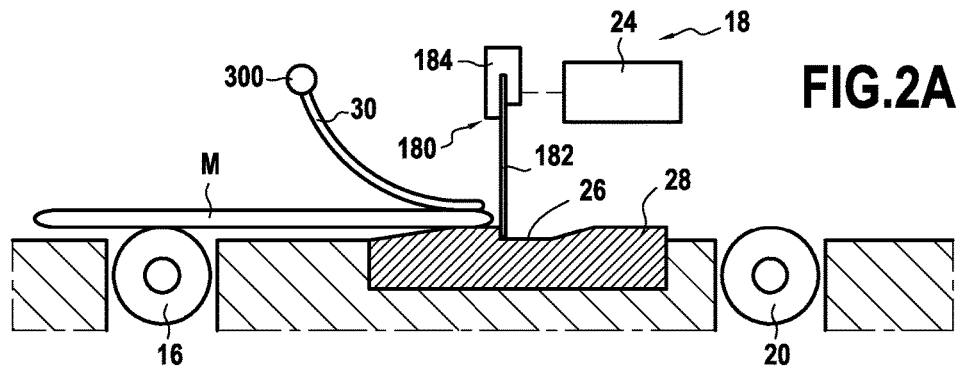
FIG. 2A to 2D are respective side views showing the successive operational positions of the mail item within the thickness measuring device according to the invention.
Figure 2B:
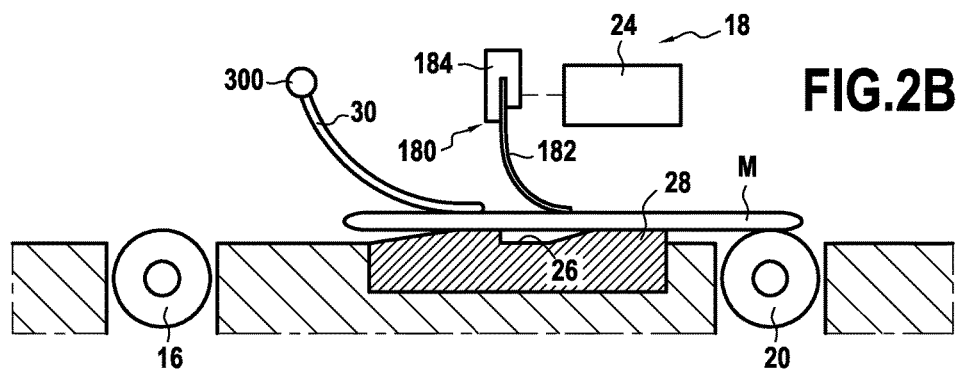
Figure 2C:
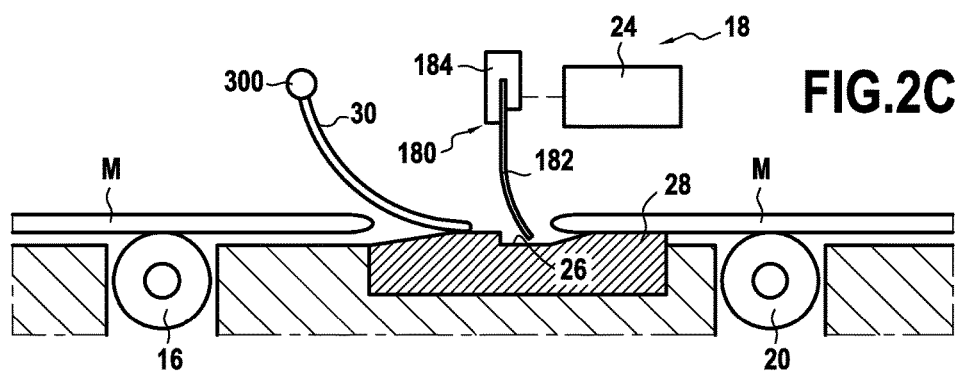
Figure 2D:
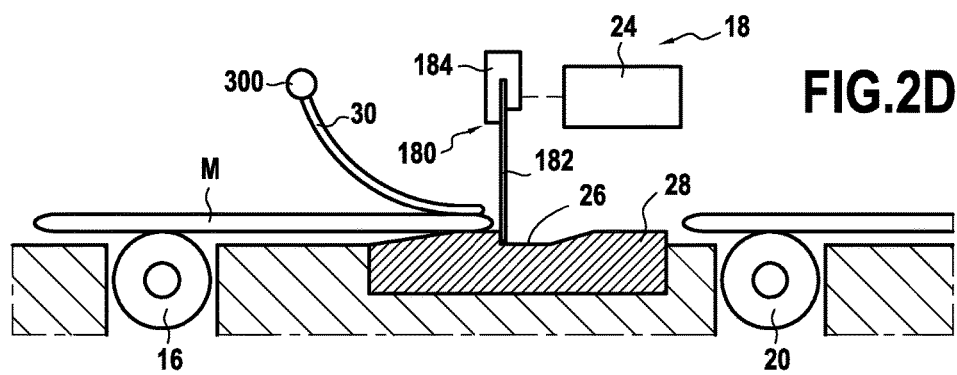

FIG. 2A to 2D show successive positions of mail item M conveyed along feed deck 12 through thickness measuring device 16. In FIG. 2A, the deflecting element 180 is at rest. In FIG. 2B, thin sensor 182 of the deflecting element 180 senses the change in the ohmic resistance r of this deflecting element as mail item M contacts this latter, and transmits the results to a processor of processing unit 24 that correlates the results to determine a thickness value for the mail item via either an empirically derived lookup table or an algorithm. In FIG. 2C, the mail item left the deflecting element 180 that returns after a bending move to the rest position of FIG. 4D in abutment against the rest slit 26.

Figure 3:
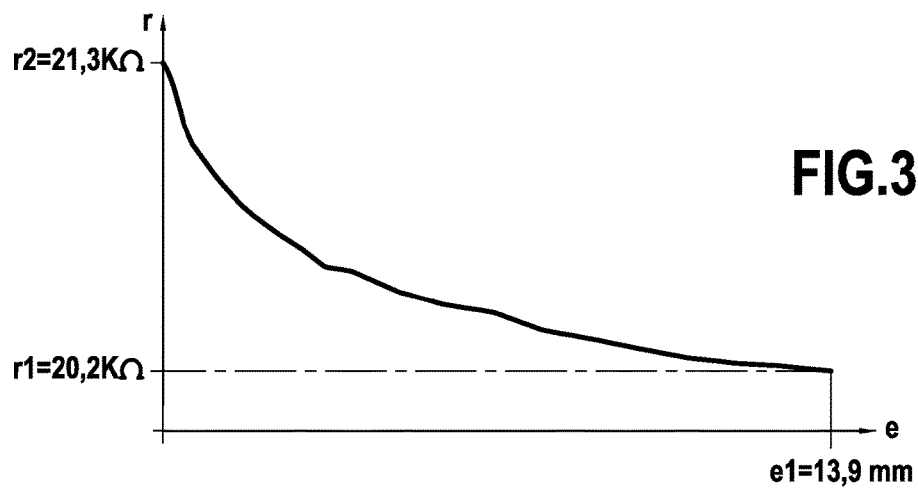
FIG. 3 is a graphical plot schematically illustrating the deflection amounts of a deflecting element incorporated within the thickness measuring device according to the invention, as a function of a measured parameter of the deflecting element.

The graphical plot on FIG. 3 schematically illustrates an example of deflection amounts of deflecting element 180 as a function of its measured resistivity. At rest the ohmic resistance $r0$ equals 21.3 K$\Omega$; when the resistance $r$ decreases, the corresponding thickness raises to 20.2 K$\Omega$ for a thickness $e1$ of 13.9 mm for example.

Processing unit 24 is also programmed for determining over the entire length of mail item M its thickness profile based on the ohmic resistance measured of deflecting element 180 caused by unbroken contact with the mail item on the one hand, and the length L of the mail item based on the transport displacement (or speed) and the time period on the other hand. This feature which is illustrated on FIG. 4, proves quite valuable. It allows first to assess the optimal thickness to use for calculating the corresponding postage, and second to determine the length L of the mail item which is part of the mail format on which depends this calculation. The pressure exerted by deflective element 180 remain small enough (15 g maximum), and the surface area of rest slit 26 also stays small enough not to deform the enough stiff mail item and distort the thickness measurement on the other hand.

Figure 4:
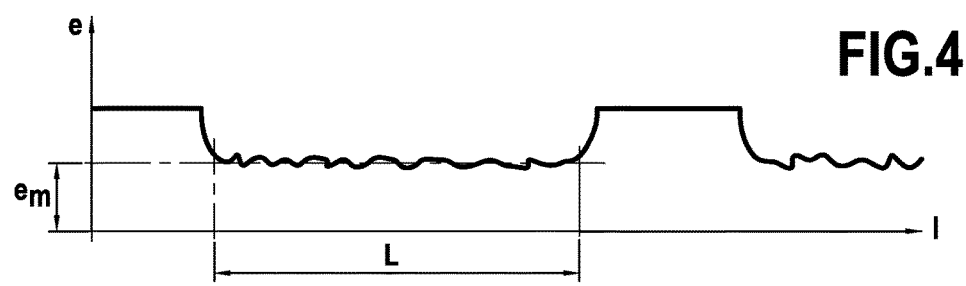
FIG. 4 and FIG. 5 are two other graphical plots schematically illustrating the thickness profile corresponding to FIG. 3 over the entire length of the mail item.
Figure 5:
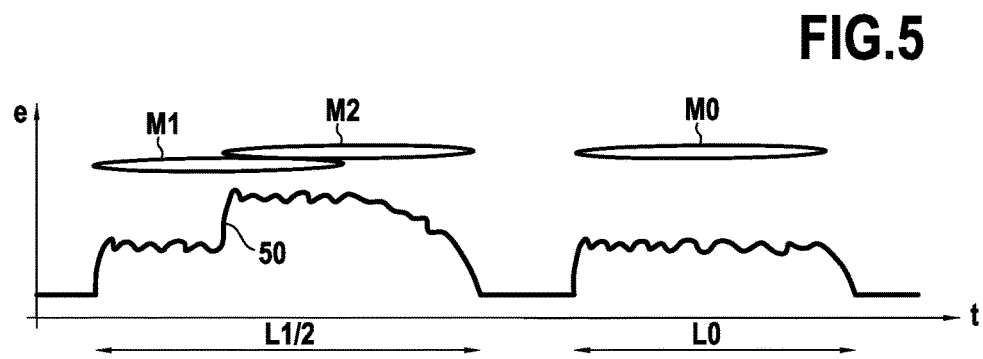

With reference to FIG. 4, FIG. 5 illustrates the additional double detection function provided by the thickness measuring device. A sudden change 50 within the thickness profile of mail item M combined with its abnormal measured length L1/2 (according to standard mail lengths L0) clearly indicates that two mail items M1, M2 are stuck to each other due to a perfectible singulation.

While this invention has been described with reference to illustrative embodiments, it is not intended to be construed in a limiting sense. Various modifications and combinations of the illustrative embodiments will be apparent to persons skilled in the art upon reference to the description. For example:

- mail items M could be conveyed on edge instead of flat along the conveying deck past a deflecting element located horizontally just downstream the singulating device of the franking machine;
- thin sensor 182 rests on even conveying deck 12 in a predefined pre-stressing state corresponding e.g. to a reference thickness value of 0.3 mm; this little arrangement allows to take the wear of the sensor into account in checking the reference resistance value;
- bearing element 30 is adjustable in order to apply a predefined pressure on the mail item;
- rest slit 26 is alternatively formed directly in the conveying deck 12;
- the deflecting element is formed of a series of thin sensors, each of which having a particular technical design with a specific deflection or thickness detection range. As each elementary thin sensor presents an optimal precision within a limited range of thickness or resistance values, this series configuration can provide the optimal precision of deflection measurement over the entire range of thicknesses to cover.

Figure 6:
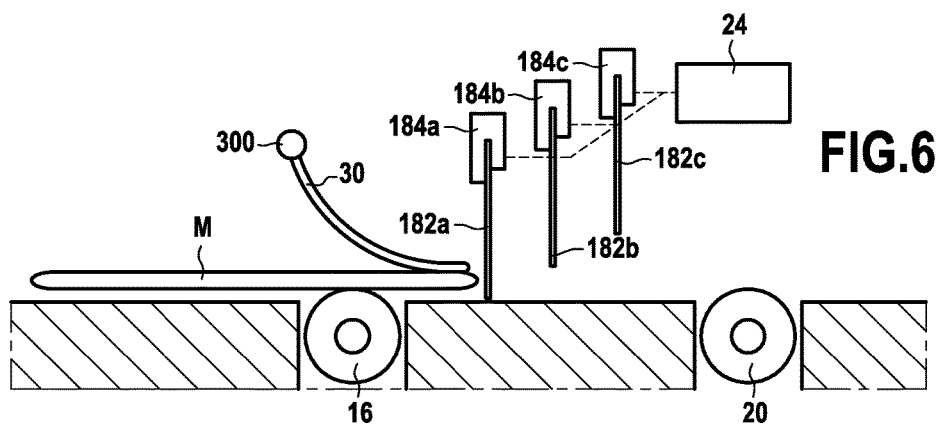
FIG. 6 is a schematic side view of a variant of the thickness measuring device according to the invention.

The optimal number of sensors could be therefore determined according to the specific number of thickness ranges each of which being assigned e.g. to a typical postage rate (6 mm, 11 mm, 20 mm). In an exemplary variant illustrated on FIG. 6, each sensor presents a specific length or active level. Thin sensors 182a, 182b, 182c held by respective sensor mounts 184a, 184b, 184c are appropriately spaced out for not interfering with each other. You can note that in this configuration, a rest slit which is not mandatory is not present to define the rest position.

Such variations are specifically contemplated to be within the scope of the invention. It is also intended that the appended claims encompass any such modifications or embodiments.

The invention claimed is:

1. An apparatus for determining the thickness of passing mail items conveyed on a conveying deck of a mail processing machine, each mail item comprising an envelope with one or more pieces of media contained therein, the apparatus comprising:
    at least one thin elongated sensor with a proximal end and a distal end, said distal end being positioned to flexibly engage each of said conveyed mail item, said thin elongated sensor which is positioned to successively flexibly contact each conveyed mail item, said thin elongated sensor which measures a parameter that indicates a change in a resistivity of said thin elongated sensor, and generates a signal indicative of the measured parameter; and
    a processing unit which receives the signal from said thin elongated sensor of and determines a thickness value for each conveyed mail item based on said measured parameter,
    wherein the contact of conveyed mail item by said thin elongated sensor is made without active compression on the mail item in order to avoid any distortion of the measurement.

2. The apparatus of claim 1, wherein said measured parameter is an ohmic resistance r of a sensor of said thin elongated sensor caused by contact with the mail item.

3. The apparatus of claim 1, wherein said processing unit is adapted to determine a thickness profile of the mail item over the entire length of mail item based on said ohmic resistance caused by unbroken contact with the mail item on the one hand, and a length L of the mail item based on a transport displacement and a time period on the other hand.

4. The apparatus of claim 1, wherein said processing unit is adapted to determine a double detection of mail items based on a sudden change within the thickness profile of mail item combined with an abnormal measured length of mail item according to standard mail lengths.

5. The apparatus of claim 1, wherein mail items are conveyed flat on said conveying deck and said thin elongated sensor is located vertically.

6. The apparatus of claim 1, wherein mail items are conveyed on edge on said conveying deck and said thin elongated sensor is located horizontally.

7. The apparatus of claim 1, wherein said proximal end secured at a proximal end to a sensor mount attached itself to a registration wall of the mail processing machine.

8. The apparatus of claim 7, wherein a series of thin elongate sensors are each secured at their proximal ends to respective sensor mounts, each of which having a particular technical design with a specific deflection or thickness detection range and active level corresponding to a typical postage rate.

9. The apparatus of claim 1, wherein said thin elongated sensor returns after a bending move to a rest position in abutment against a rest slit arranged in said conveying deck.

10. The apparatus of claim 9, wherein said rest position is defined by a predetermined pre-stressing value corresponding to a reference thickness.

11. The apparatus of claim 1, wherein a bearing element is located upstream and close to said thin elongated sensor for optimally pressing the mail item against said conveying deck, and secured at a proximal end to a registration wall of the mail processing machine.

12. The apparatus of claim 11, wherein said bearing element comprises a holding arm at the lower end of which is fixed a supple flap, a supple brush, a supple pressure roller, or a supple pad formed by one or more juxtaposed elementary pads.

13. The apparatus of claim 11, wherein said at least one thin elongated sensor exerts a light pressure on the mail item, and said bearing element applies an adjustable higher pressure on this mail item.

14. An apparatus to process mail items, the mail items which are conveyed on a conveying deck along a direction of travel, the conveying deck having a width, the width of the conveying deck which extends laterally with respect to the direction of travel, the apparatus comprising:
    a first elongated sensor having a proximal, a distal end, and a width, the first elongated sensor resiliently deformable and having at least one measurable physical property that is representative of an amount of deformation, the at least one measurable physical property that is representative of an amount of deformation is a resistivity of the resiliently deformable first elongated sensor, the first elongated sensor mounted with the distal end at least proximate a portion of the conveying deck to successively physically engage the mail items as the mail items move in the direction of travel past the first elongated sensor, and mounted with the width of the first elongated sensor extending laterally across a portion of the width of the conveying deck, the width of the first elongated sensor smaller than the width of the conveying deck; and
    a processor circuit communicatively coupled to the first elongated sensor and which in operation determines a thickness value for the mail items based on said measurable physical property that is representative of a current amount of deformation of the first elongated sensor.

15. The apparatus of claim 14 wherein the first elongated member is cantilevered at the proximate end thereof.

16. The apparatus of claim 14 the first elongated sensor exerts no more than 15 grams of force on the mail items.

17. The apparatus of claim 14 wherein the conveying deck has a substantially planar surface with a slot therein, and the first elongated sensor is mounted such that the distal end thereof extends beyond the substantially planar surface of the conveying deck into the slot therein, and the first elongated sensor returns after a bending to a rest position in abutment with a portion of the slot.

18. The apparatus of claim 14 wherein, for each mail item, the processor circuit determines a thickness profile along an entire dimension of the mail item, and identifies an occurrence of a double mail item in response to a combination of both a sudden change in thickness in the thickness profile and a detected length that exceeds an expected length.

19. The apparatus of claim 14, further comprising:
at least a second elongated sensor having a proximal, a distal end, and a width, the second elongated sensor resiliently deformable and having at least one measurable physical property that is representative of an amount of deformation, the second elongated sensor mounted with the distal end at least proximate a portion of the conveying deck to successively physically engage the mail items as the mail items move in the direction of travel past the second elongated sensor, and mounted with the width of the second elongated sensor extending laterally across a portion of the width of the conveying deck, the width of the second elongated sensor smaller than the width of the conveying deck, the second elongated sensor mounted spaced along the direction of travel with respect to the first elongated sensor, and wherein the processor circuit communicatively coupled to the second elongated sensor and which in operation determines the thickness value for the mail items based on the measurable physical property from both the first and the second elongated sensors.

20. The apparatus of claim 19, further comprising:
at least a third elongated sensor having a proximal, a distal end, and a width, the third elongated sensor resiliently deformable and having at least one measurable physical property that is representative of an amount of deformation, the third elongated sensor mounted with the distal end at least proximate a portion of the conveying deck to successively physically engage the mail items as the mail items move in the direction of travel past the third elongated sensor, and mounted with the width of the third elongated sensor extending laterally across a portion of the width of the conveying deck, the width of the third elongated sensor smaller than the width of the conveying deck, the third elongated sensor mounted spaced along the direction of travel with respect to the first elongated sensor, and wherein the processor circuit communicatively coupled to the third elongated sensor and which in operation determines the thickness value for the mail items based on the measurable physical property from both the first and the third elongated sensors.

* * * * *